Oct. 29, 1946.  V. L. CRAWFORD  2,410,202
SAFETY DEVICE FOR FLUID BRAKE SYSTEMS
Filed July 19, 1945  2 Sheets-Sheet 1
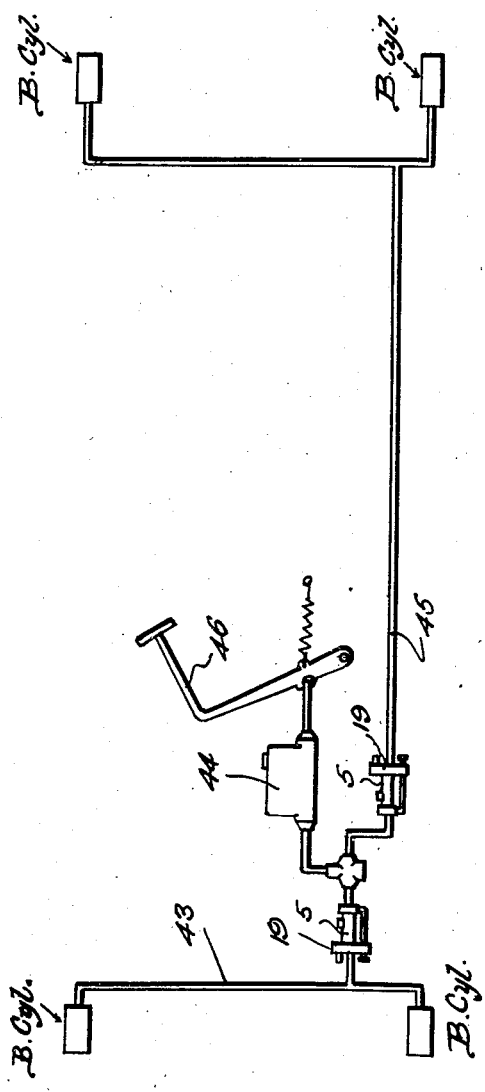
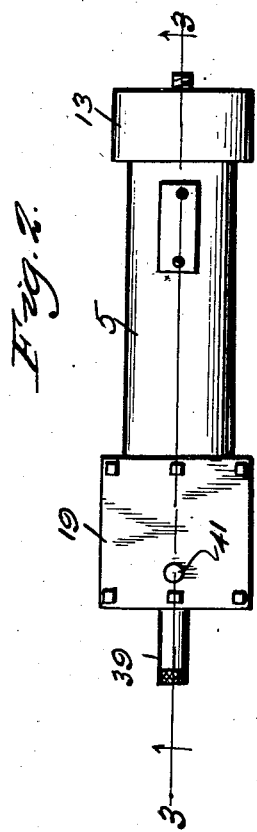
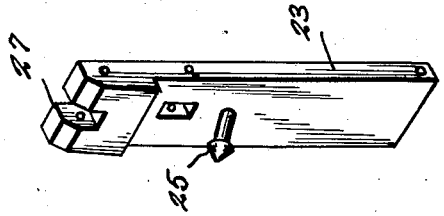
Inventor
Victor L. Crawford
By *Clarence A. O'Brien*
and *Harvey B. Jacobson*
Attorneys

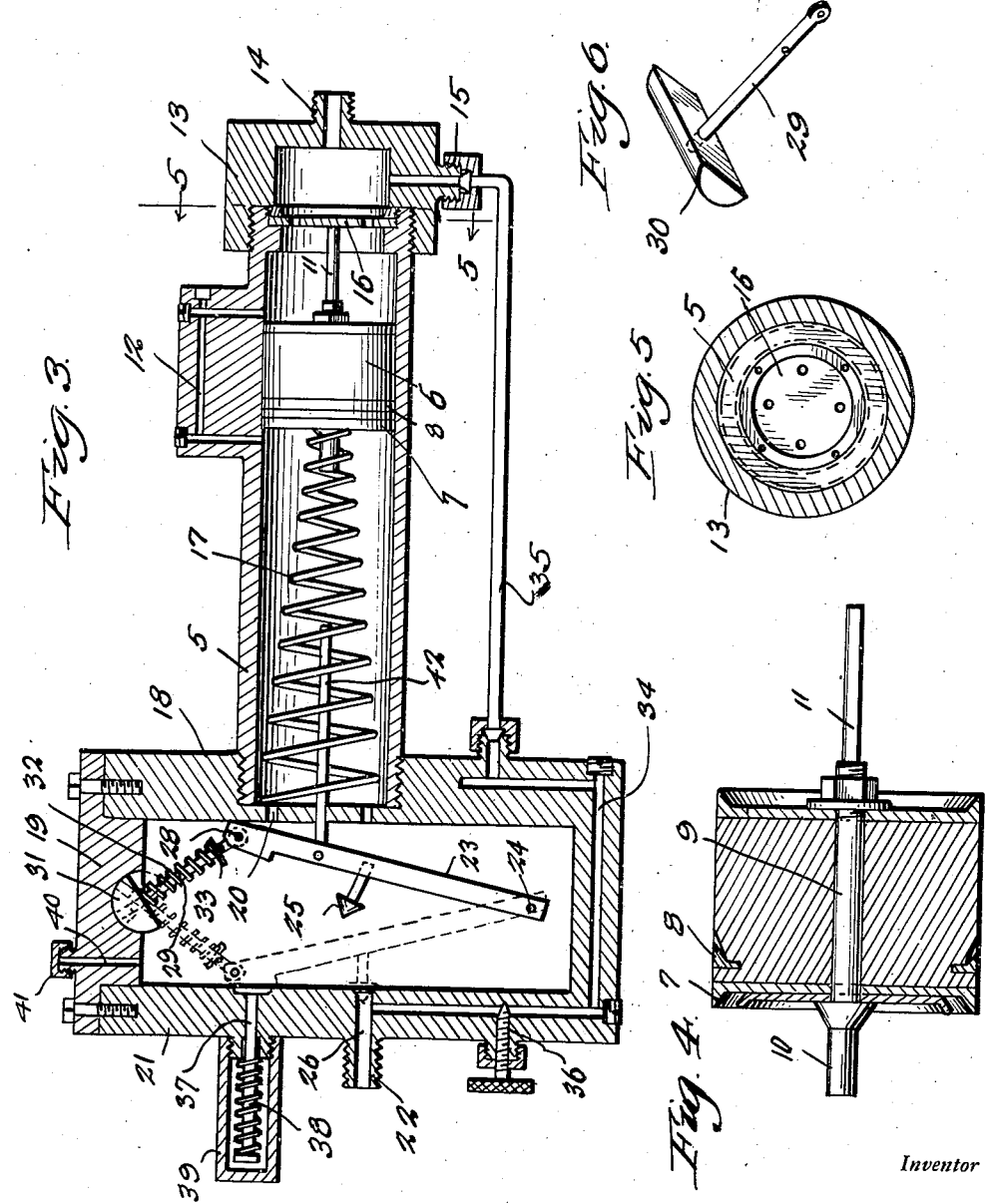

Patented Oct. 29, 1946

2,410,202

UNITED STATES PATENT OFFICE 2,410,202

SAFETY DEVICE FOR FLUID BRAKE SYSTEMS

Victor L. Crawford, Altamont, Ill.

Application July 19, 1945, Serial No. 605,927

4 Claims. (Cl. 303—84)

1

The present invention relates to new and useful improvements in hydraulic brakes for motor vehicles, and more particularly to a safety device interposed in the brake line and adapted to effectively cut off fluid pressure with a portion of the system in the event of seepage or breakage in the line which would otherwise unbalance or destroy the effectiveness of the system as a whole.

In hydraulic brake systems for motor vehicles the entire system functions as a unit and should leakage develop in the fluid pressure line adjacent one of the wheels, it may result in a failure of the entire brake system.

Accordingly, it is an object of the present invention to provide means connected in the fluid pressure line leading to the brakes of the wheels so that in the event of leakage or breakage in any of the wheels, the defective portion of the system will be sealed off without affecting the operation of the remaining brakes.

The invention embodies the provision of a safety cut-off valve placed in the brake line for the front pair of wheels and a similar safety valve placed in the brake line for the rear pair of wheels in order that at least one pair of wheels will at all times be provided with effective braking means, should a failure occur in the brake line for the other pair of wheels.

A further object of the invention is to provide a safety device of this character of simple and practical construction, which is automatic in its operation, relatively inexpensive to manufacture, easy to install in operative position without necessitating any material changes or alterations in the construction of the brake system, and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a diagram of a hydraulic brake system showing my invention connected in the line leading to the front and rear brakes.

Figure 2 is an enlarged top plan view of one of the safety devices.

Figure 3 is an enlarged longitudinal sectional view taken substantially on a line 3—3 of Figure 2.

Figure 4 is a longitudinal sectional view of the piston.

Figure 5 is a transverse sectional view taken substantially on a line 5—5 of Figure 3.

2

Figure 6 is a perspective view of the rockable rod for the off-center spring to close the valve.

Figure 7 is a perspective view of the pivoted valve-supporting plate.

Referring now to the drawings in detail, wherein for the purpose of illustration I have disclosed a preferred embodiment of the invention, the numeral 5 designates a cylinder having a piston 6 working therein, the piston having flexible sealing cups 7 at each end and a flexible sealing cup 8 mounted in the side of the piston adjacent one end. A stem 9 projects through the piston with its ends 10 and 11 projecting outwardly at opposite sides of the piston.

A by-pass passage 12 is formed in one side of the cylinder 5 opening at opposite sides of the piston.

One end of the cylinder 5 is closed by a cap 13 having a threaded nipple 14 at its outer end and a threaded nipple 15 at one side. A perforated plate 16 is held in position in the end of the cylinder by the cap 13 and against which the end 11 of the piston stem is adapted to abut to normally hold the piston centered between the ends of the by-pass passage 12.

A coil spring 17 has one end engaging the opposite side of the piston 6 and has its opposite end bearing against a wall 18 of a valve chamber 19 to which the cylinder 5 is attached. The wall 18 is formed with ports 20 to provide communication between the cylinder 5 and the valve chamber 19.

The valve chamber 19 includes a wall 21 opposed to the wall 18 and having a threaded nipple 22 formed on the outside thereof.

A valve plate or arm 23 is pivoted at one end in the valve chamber 19 by means of a transverse pin 24, the valve plate having a conical valve 25 projecting from one side thereof and adapted to seat against the inner end of the passage 26 for the nipple 22 to close said passage.

The free end of the plate 23 is formed with a slot 27 having a pin 28 extending transversely thereof and on which one end of a rod 29 is pivoted, the rod being formed or provided at its other end with a semi-cylindrical head 30 which is rockably seated in a groove 31 formed on the inside of the valve chamber 19. A coil spring 32 is mounted on the rod 29 with one end bearing against the head 30 and its other end bearing against a washer and pin 33 carried by the rod 29 adjacent its pivoted end. The rod 29 is slidably mounted in the head 30 so that the spring 32 exerts its tension on the valve plate 23 to maintain the valve 25 in either its open or closed position, when the valve plate and rod are in either off-center position, as shown by the full and dotted lines in Figure 3 of the drawings. The valve housing 19 is formed in its walls with a passage 34 communicating at one end with the passage 26 and connected to the nipple 15 of the cap 13 by means of a pipe 35. A manually operable needle-type valve 36 is threaded in the wall 21 of the valve housing to close communication through the passage 34.

A plunger 37 is also slidably mounted in the wall 21 of the valve housing with its inner end adapted to engage the free end of the valve plate 23 to move the valve into its open position, as shown by the full lines in Figure 3 of the drawings, upon an inward movement of the plunger 37. The plunger is normally projected outwardly by means of a coil spring 38 mounted thereon and the plunger and coil spring are inclosed within a removable cover 39 threaded to the wall 21 of the valve housing to protect the plunger against accidental operation.

The valve housing 19 is also formed with a bleed port 40 closed at its outer end by a threaded cap 41.

The valve plate 23 is provided with a pivoted rod 42 which projects therefrom in a direction opposite from the valve 25 and is slidably mounted in the wall 18 of the valve housing to project into the cylinder 5 in the path of the end 10 of the piston stem 9, the rod 42 normally being spaced from said end of the piston stem.

A pair of the safety devices embodying the cylinder 5, valve housing 19 and the mechanism heretofore described, and as illustrated in detail in Figure 3 of the drawings, are connected in the hydraulic brake system of a motor vehicle, one of the safety devices being connected in the brake line 43 leading from the master brake cylinder 44 to the front wheel brakes, while the other safety device is connected in the brake line 45 for the rear wheel brakes. The brake line leading from the master cylinder is connected to the nipple 14 at one end of the cylinder 5 while the brake line leading to the brake cylinders is connected to the nipple 22 of the valve housing 19.

As pressure is applied to the brakes by depressing the foot pedal 46, in the usual manner, the braking fluid is forced through the stop plate 16 against the front side of the piston 6 which in turn compresses the fluid in the cylinder 5 and valve housing 19 to subject the brake cylinders to such pressure. The by-pass passage 12 is of relatively small diameter so that a slow forward movement of the piston 6 is permitted under the influence of the pressure from the master cylinder 44 until the sealing cup 8 covers the front end of the by-pass passage 12 and which holds the fluid pressure behind the piston until the brakes are released. The spring 17 then moves the piston 6 rearwardly until the rear end 11 of the piston rod strikes the plate 16.

The forward travel of the piston 6 is thus limited during the normal operation of the brake system so that the front end 10 of the piston stem will not strike the rod 42 and the valve plate 23 and valve 25 will be maintained in open position by the spring 32, thus maintaining the passage 26 open leading to the brake cylinder.

However, should a leak occur in the brake line between any of the brake cylinders and the valve housing 19, the pressure in front of the piston 6 is consequently reduced, and when the brake pedal 26 is applied, the piston 6 will be forced forwardly in the cylinder 5 until the front end 10 of the piston stem 9 strikes the rod 42 whereby to move the valve plate 23 and valve 25 into position for closing the passage 26 and the portion of the brake system connected thereto is thus cut off and held in its cut-off position by the spring 32. The unaffected brakes in the brake system will function in the usual manner by subsequent operation of the brake pedal.

When the defective brake line has been repaired, the cap 39 is removed and the plunger 38 forced inwardly to open the valve 25 and reset the valve plate 23 and the cap 41 for the bleed port 40 is then opened and the valve 36 also opened to bleed air from the system by way of the pipe 35 and passage 34.

In view of the foregoing description taken in conjunction with the accompanying drawings, it is believed that a clear understanding of the construction, operation and advantages of the device will be quite apparent to those skilled in the art. A more detailed description is accordingly deemed unnecessary.

It is to be understood, however, that even though I have herein shown and described a preferred embodiment of my invention, the same is susceptible to certain changes fully comprehended by the spirit of the invention as herein described and the scope of the appended claims.

Having thus described the invention, what I claim is:

1. A safety device for hydraulic brake systems comprising a valve housing having one side connected in the brake line, a cylinder also connected at one end in the brake line and having its other end connected to the housing, an off-center spring-actuated toggle mechanism in the housing, a valve carried by said mechanism for closing the brake line and normally maintained in open position, and a piston working in the cylinder and responsive to variations in fluid pressure at opposite sides of the piston to move the piston into engagement with the toggle mechanism to close the valve.

2. A safety device for hydraulic brake systems comprising a valve housing having one side connected in the brake line, a cylinder also connected at one end in the brake line and having its other end connected to the housing, an off-center spring-actuated toggle mechanism in the housing, a valve carried by said mechanism for closing the brake line and normally maintained in open position, and a piston working in the cylinder and responsive to variations in fluid pressure at opposite sides of the piston to move the piston into engagement with the toggle mechanism to close the valve, and a plunger carried by the housing for manual operation and arranged to engage and move the toggle mechanism in a direction for opening the valve.

3. A safety device for hydraulic brake systems comprising a valve housing having one side connected in the brake line, a cylinder also connected at one end in the brake line and having its other end connected to the housing, an off-center spring-actuated toggle mechanism in the housing, a valve carried by said mechanism, for closing the brake line normally maintained in open position, and a piston working in the cylinder and responsive to variations in fluid pressure at opposite sides of the piston to move the piston into engagement with the toggle mechanism to close the valve, a plunger carried by the housing for manual operation and arranged to engage and move the toggle mechanism in a direction for opening the valve, and a bleed system for the housing including a valve-controlled passage leading from the housing to the cylinder at the far side of the piston.

4. A safety device for hydraulic brake systems comprising a valve housing having one side connected in the brake line, a cylinder also connected at one end in the brake line and having its other end connected to the housing, an off-center spring-actuated toggle mechanism in the housing, a valve carried by said mechanism, for closing the brake line normally maintained in open position, and a piston working in the cylinder and responsive to variations in fluid pressure at opposite sides of the piston to move the piston into engagement with the toggle mechanism to close the valve, a plunger carried by the housing for manual operation and arranged to engage and move the toggle mechanism in a direction for opening the valve, a by-pass passage in the cylinder opening at opposite sides of the piston and adapted to be closed by the piston upon a predetermined movement thereof, and a bleed system for the housing including a valve-controlled passage leading from the housing to the cylinder at the far side of the piston, said bleed system being closed by the closing of said first-named valve.

VICTOR L. CRAWFORD.